(12) United States Patent
Gebhardt et al.

(10) Patent No.: US 10,323,165 B2
(45) Date of Patent: Jun. 18, 2019

(54) AGGLOMERATE ABRASIVE GRAIN COMPRISING INCORPORATED HOLLOW MICROSPHERES

(71) Applicant: ImerTech SAS, Paris (FR)

(72) Inventors: Knuth Gebhardt, Klagenfurt (AT); Georg Paul Zylka, Bad-Sackingen (DE)

(73) Assignee: ImerTech SAS, Paris (FR)

(*) Notice: Subject to any disclaimer, the term of this patent is extended or adjusted under 35 U.S.C. 154(b) by 0 days.

(21) Appl. No.: 14/369,892

(22) PCT Filed: Sep. 11, 2013

(86) PCT No.: PCT/EP2013/068850
§ 371 (c)(1),
(2) Date: Jun. 30, 2014

(87) PCT Pub. No.: WO2014/041039
PCT Pub. Date: Mar. 20, 2014

(65) Prior Publication Data
US 2015/0052824 A1 Feb. 26, 2015

(30) Foreign Application Priority Data
Sep. 12, 2012 (DE) .................. 10 2012 017 969

(51) Int. Cl.
*C09K 3/14* (2006.01)
*C04B 28/00* (2006.01)
(Continued)

(52) U.S. Cl.
CPC .......... *C09K 3/1436* (2013.01); *C04B 18/02* (2013.01); *C04B 28/006* (2013.01); *C04B 28/26* (2013.01);
(Continued)

(58) Field of Classification Search
None
See application file for complete search history.

(56) References Cited

U.S. PATENT DOCUMENTS

| 4,111,713 A | 9/1978 | Beck |
| 4,652,275 A * | 3/1987 | Bloecher .............. C09K 3/1436 51/298 |

(Continued)

FOREIGN PATENT DOCUMENTS

| CN | 1646261 A | 7/2005 |
| CN | 1646262 A | 7/2005 |

(Continued)

OTHER PUBLICATIONS

Conversion of Percentage by Volume of Glass Hollow Bodies to Percentage by Weight of Glass Hollow Bodies.*

(Continued)

*Primary Examiner* — Colleen P Dunn
*Assistant Examiner* — Ross J Christie
(74) *Attorney, Agent, or Firm* — Finnegan, Henderson, Farabow, Garrett & Dunner LLP

(57) ABSTRACT

An agglomerate abrasive grain includes a mixture of individual abrasive grains and hollow bodies, wherein the abrasive grains and the hollow bodies are held together via a binding matrix of aluminosilicate and alkali silicate, and the agglomerate abrasive grain has an open porosity and a closed porosity in each case ranging from 5% by volume to 40% by volume, wherein the total porosity of the agglomerate abrasive grain is less than 50% by volume.

8 Claims, 1 Drawing Sheet

(51) Int. Cl.
  *C04B 28/26* (2006.01)
  *C04B 18/02* (2006.01)
  *C04B 12/04* (2006.01)
  *C04B 14/02* (2006.01)
  *C04B 111/00* (2006.01)
  *C04B 40/02* (2006.01)
  *C04B 14/32* (2006.01)
  *C04B 14/30* (2006.01)
  *C04B 14/10* (2006.01)

(52) U.S. Cl.
  CPC ... *C04B 2111/00215* (2013.01); *Y02P 40/165* (2015.11)

(56) References Cited

U.S. PATENT DOCUMENTS

| | | | |
|---|---|---|---|
| 4,799,939 A * | 1/1989 | Bloecher | B24D 11/001 51/293 |
| 5,039,311 A * | 8/1991 | Bloecher | B24D 3/28 51/295 |
| 5,863,308 A * | 1/1999 | Qi | B24D 3/14 51/309 |
| 6,679,758 B2 | 1/2004 | Bright et al. | |
| 7,654,323 B2 | 2/2010 | Alary et al. | |
| 2002/0066233 A1* | 6/2002 | McArdle | B24D 3/04 51/308 |
| 2006/0211342 A1 | 9/2006 | Bonner et al. | |
| 2007/0074456 A1* | 4/2007 | Orlhac | B24D 3/00 51/309 |
| 2008/0085660 A1* | 4/2008 | Orlhac | B24D 3/20 451/28 |
| 2009/0100766 A1 | 4/2009 | Gebhardt | |
| 2009/0139149 A1 | 6/2009 | Sachse | |
| 2011/0183142 A1* | 7/2011 | Gebhardt | B24D 3/14 51/308 |
| 2013/0152482 A1* | 6/2013 | Sarangi | C09K 3/1409 51/309 |

FOREIGN PATENT DOCUMENTS

| | | |
|---|---|---|
| CN | 101412902 A | 4/2009 |
| CN | 101460587 A | 6/2009 |
| CN | 102177000 A | 9/2011 |
| DE | 102006020362 A1 | 10/2007 |
| EP | 2 174 751 A1 | 4/2010 |
| EP | 2 455 185 A2 | 5/2012 |
| GB | 2 021 626 A | 12/1979 |
| JP | 2003-220561 A | 8/2003 |
| JP | 2005-072912 A | 3/2005 |
| JP | 2011-104769 A | 6/2011 |
| RU | 2378198 C1 | 1/2010 |
| WO | WO 03/086703 A1 | 10/2003 |
| WO | WO 2008/112914 A2 | 9/2008 |
| WO | WO 2014/041039 A1 | 3/2014 |

OTHER PUBLICATIONS

"DiaTest-SI Version 4 Static Test and Optical inspection" CFS Apparatus Operating Manual. Vollstadt-Diamant GmbH (Mar. 7, 2005).*

Decision to Grant dated Aug. 24, 2015, in corresponding Russian Patent Application No. 2014130731/05(049418).

Office Action dated Apr. 20, 2015, in related Chinese Patent Application No. 201380006318.4.

International Search Report and Written Opinion dated Jan. 27, 2014, for International Application No. PCT/EP2013/068850.

Office Action dated May 25, 2015, in related Japanese Patent Application No. 2014-558164.

\* cited by examiner

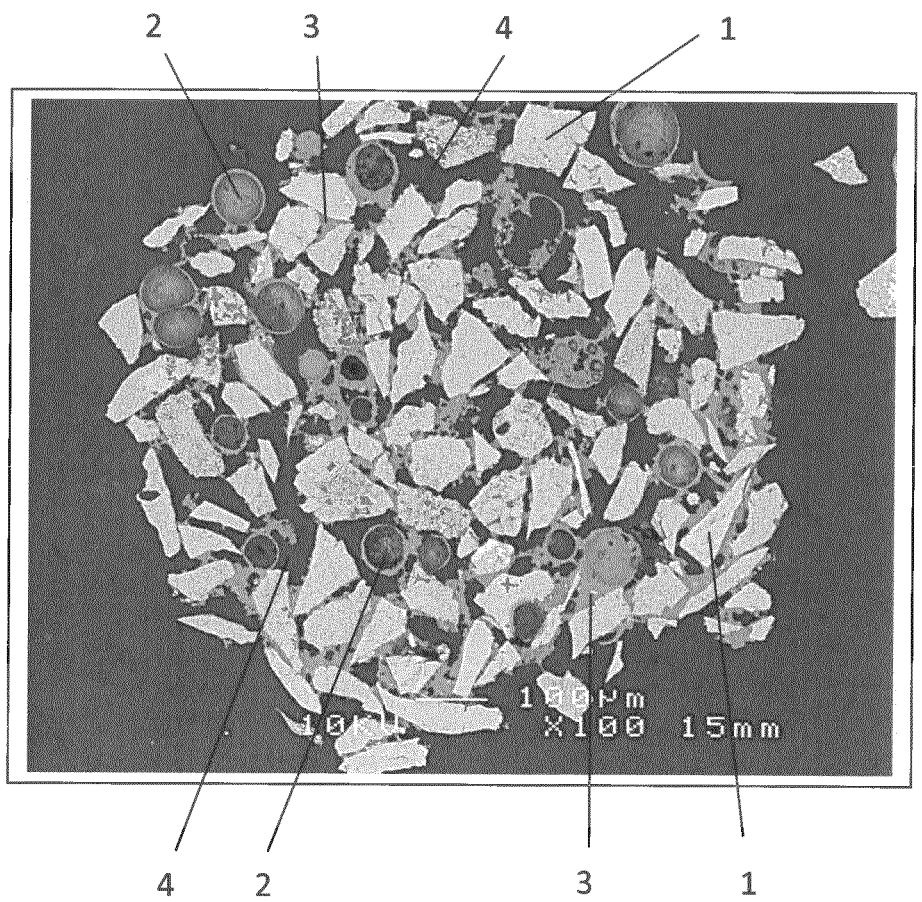

AGGLOMERATE ABRASIVE GRAIN COMPRISING INCORPORATED HOLLOW MICROSPHERES

CLAIM FOR PRIORITY

This application is a U.S. national phase entry under 35 U.S.C. § 371 from PCT international Application No. PCT/EP2013/068850, filed Sep. 11, 2013, which claims the benefit of priority of German Patent Application No. 10 2012 017 969.3, filed Sep. 12, 2012, the subject matter of which is incorporated herein by reference.

The present invention refers to an agglomerate abrasive grain comprising the characteristics described in the preamble of claim 1 as well as to a method for the production thereof.

Agglomerate abrasive grains have been known for a long time in the abrasive industry and are typically used in grinding wheels and grinding belts. These are agglomerates of individual abrasive grains comprising a predetermined average grit size, wherein the abrasive grains are held together by means of a binding matrix. Inorganic or organic binders can be used as binding agents, wherein phenolic resins are often used as organic binders, while glass-like or ceramic materials are used as inorganic binders.

A big advantage of agglomerate abrasive grains is that finely divided compact abrasive grains can be used as primary particles, from which an agglomerate abrasive grain is formed, which is relatively large in comparison with the source grains, which consists of a plurality of individual grains, and which shows a completely different wear mechanism during the grinding process in comparison with an individual grain having a comparable size.

While, normally, an individual grain is blunted or destroyed depending on the pressure conditions during the grinding process, the agglomerate abrasive grain can be specifically selected and applied such that individual worn primary abrasive grains break out of the binding matrix of the agglomerate abrasive grain and that abrasive grains located therebelow are used instead, so that new cutting edges are exposed continuously. Such agglomerate abrasive grains thus have a long lifetime, are characterized by a cool cutting and generate a homogenous uniform grinding surface pattern for the entire lifetime.

For processing of surfaces with abrasives, completely different demands are made on the abrasive, depending on the material to be processed, the grinding method used and the desired surface quality. The processing of surfaces made of different materials, such as wood, metal, ceramics, natural stone or plastic, e.g., thus also requires different grinding conditions and abrasives, which must be adapted individually to the respective application.

While only the abrasive grain type and the abrasive grain size can be varied when using individual abrasive grains, the use of agglomerate abrasive grains offers numerous additional possibilities for optimizing the agglomerate abrasive grain for the respective application.

Abrasive grain agglomerates, which are made up of finely divided primary abrasive grains held together by means of a binder on the basis of aluminosilicate, are described in EP 2 174 751 A1. The applied inorganic binder hardens completely at temperatures of below 450° C., wherein abrasive grain agglomerates of extraordinarily high strength are formed, which have large advantages for a number of applications, in the case of which difficult to machine materials are ground with high pressures. However, due to their high strength, these abrasive grain agglomerates are not very well suited for mild grinding conditions.

U.S. Pat. No. 4,799,939 describes erodible agglomerates including individual abrasive grains arranged in an erodible matrix of binder and hollow bodies. Preferably, the hollow bodies are hollow spheres and have the function of making the binding matrix readily degradable. The hollow spheres have a small diameter, so that as many of these hollow spheres as possible can be incorporated into the binding matrix. Preferably, organic compounds are used as binding agents.

GB 2 021 626 discloses an abrasive grain granulate, wherein abrasive grains and pore-forming particles are held together by means of a synthetic resin binder. The granulates have a grit size of between 420 µm and 2000 µm, wherein the individual abrasive grains have a grit size of less than 250 µm and are present in a quantity of between 15 and 40 percent by volume, while the pore-forming particles have a size of between 44 µm and 297 µm and are present in a quantity of between 2 and 75 percent by volume. The binding agent has a percentage of between 10 and 50 percent by volume. Due to the fact that it became apparent that a satisfactory bond is already reached when a volume of binder is provided being considerably smaller than the volume between the solid particles, the finished aggregates can exhibit a network of pores, which are connected to one another. This open porosity can reach up to 50% of the total volume of the aggregate.

According to the two last-mentioned documents, relatively soft abrasive grain agglomerates well suited for mild grinding conditions are achieved, particularly, when preferably using synthetic resin binding agents.

However, due to the already mentioned different materials and grinding conditions, there is still a high demand for specific agglomerate abrasive grains for the machining of surfaces, which grains have been further developed and optimized for specific grinding operations, in particular also for materials, which are to be processed moderately at pressures, which are not too high.

This object is solved by means of an agglomerate abrasive grain comprising the characteristics described in claim 1. Further developments and advantageous embodiments of the agglomerate abrasive grain according to the invention are subject matter of the subclaims.

Trying to develop and to optimize an agglomerate abrasive grain for processing different moderately to machined materials it became apparent that particularly good results are reached, when the respective agglomerate abrasive grain has a relatively strong bond between the individual abrasive grains and thereby simultaneously a certain portion of closed and open porosity. The strong bond is reached by means of a binding matrix of aluminosilicate and alkali silicate comprising a molar ratio of $Al_2O_3$ to $SiO_2$ of between 1:2 and 1:20, wherein the binding matrix is hardened at temperatures of below 500° C. The closed porosity can preferably be adjusted by adding hollow bodies, which are mixed with the individual abrasive grains during the production of agglomerate abrasive grains. The adjustment of the open porosity is effected mainly via the quantity of used binder.

Due to the fact that the hardening of the binding matrix takes place at a temperature, which is extremely low for an inorganic binder, temperature-sensitive individual abrasive grains can also be used, so as to obtain a stable agglomerate abrasive grain therefrom. The individual abrasive grains are selected from the group consisting of corundum, fused corundum, sintered corundum, alumina zirconia, silicon carbide, boron carbide, cubic boron nitride, diamond and mixtures thereof.

Preferably, a mixture of an aluminosilicate, an alkali sodium silicate, and water is used for the binding matrix, wherein metakaolins, flue ashes, slags, rock dust, fine sands and activated clays can be used as aluminosilicate, which are extremely fine particulated having a sufficient activity for forming aluminosiliceous gels by polycondensation reactions of the siliceous and aluminosiliceous components at temperatures of below 500° C.

However, in addition to these raw materials, which arise in large quantities as byproducts and waste products during the energy generation and from the raw materials production, any other materials can also be used, which include aluminum oxide and silicon oxide in designated quantities and in sufficiently reactive form, so as to initiate a polycondensation and so as to form three-dimensional networks of $SiO_4$ and $AlO_4$ tetrahedrons. Instead of the aluminosilicates, reactive aluminum oxides or hydroxides can thus also be used together with $SiO_2$-rich sodium silicates.

Using abrasive grain agglomerates according to EP 2 174 751, it had become apparent that the high strength of the abrasive grain agglomerates, which is reached by means of the inorganic bond, has a disadvantageous effect related to several grinding operations. In particular in the case of sensitive materials, surface defects were detected, which were attributed to the fact that, due to the highly strong bond, the break-out of the individual worn abrasive grains from the agglomerate abrasive grain does no longer work correctly with respect to certain pressure ratios, which then eventually leads to surface defects, when individual abrasive grains, for example, protrude from the binding matrix. It became apparent that these disadvantages can be compensated by incorporating hollow bodies, whereby the structure and hardness of the agglomerate abrasive grains can be specifically adjusted to the specifications of the grinding process. With an increasing amount of hollow bodies, the agglomerate abrasive grain acts softer when used, whereby, surprisingly, the pressure resistance of the agglomerate abrasive grain, however, does not decrease to the same extend, so that the processability, the transportability and a sufficient stability of the agglomerate abrasive grain is also still guaranteed.

In addition, it became apparent that higher removal rates can be reached together with to lower abrasive grain wear, when, in addition to the closed porosity, which can be attained by integrating hollow bodies, the agglomerate abrasive grain also comprises a certain portion of open porosity, which can be controlled by the quantity of binding agent. Both the open porosity as well as the closed porosity should thereby have a portion of between 5% by volume and 40% by volume. It also became apparent that the total porosity of the agglomerate abrasive grain should be below 50% by volume, because the bonding of the individual grains in the agglomerate abrasive grain is obviously destabilized when the sum of open and closed porosity is 50% by volume or more. The finding of the optimum ratio of open porosity to closed porosity is the subject matter of further tests.

In the context of the present works, the determination of the percentages by volume of closed porosity, abrasive grains and binding matrix is carried out via the used weight portions of the respective source materials, wherein the percentages by volume of the source materials were calculated by means of the used quantities and the respective specific weights, based on the percentages by volume of open pores, which are measured by mercury porosimetry. The values for the percentages by volume calculated in this manner were checked by means of polished sections. Thereby, a close conformity between the calculated percentages by volume and the volume distributions optically identified in the polished sections became apparent.

An example for such a polished section is illustrated in FIG. 1.

FIG. 1 shows a scanning electron microscope image of a polished section of an agglomerate abrasive grain according to the invention in 100-fold magnification. The agglomerate abrasive grain, which is made up of alumina zirconia abrasive grains 1 (ZK 40 P180, Treibacher Schleifmittel), glass spheres 2 and binder 3, has a virtually spherical shape, wherein the alumina zirconia abrasive grains 1 can be identified as bright irregular areas, the glass spheres 2 can be identified as spherical formations comprising a bright border, the binding matrix 3 can be identified as grey areas between the alumina zirconia abrasive grains 1 and the glass spheres 2, and the open pores 4 can be identified as dark areas next to the grey areas between the alumina zirconia abrasive grains 1 and the glass spheres 2. The agglomerate abrasive grain illustrated in FIG. 1 corresponds to a composition according to example 4, in which 30% by volume of the abrasive grains are replaced by hollow bodies.

An optimal combination of three different factors is considered to be an explanation for the surprisingly good grinding results. Initially, the high strength of the inorganic bond has to be considered having the additional advantage that this strength is reached at low temperatures, so that in particular thermally less stable abrasive grains can also be processed without any problem into inorganically bonded agglomerate abrasive grains comprising a high fracture strength. Possible disadvantages of the strong bond are compensated by the incorporation of hollow bodies, which slightly reduce the strength of the agglomerate abrasive grain as a whole again and which simultaneously facilitate the self-sharpening mechanism, wherein the pores resulting during the grinding process by the destruction of the hollow bodies additionally facilitate the direct contact of cooling lubricants with the material surface, whereby the surface quality of the processed material is improved. At the same time, space is provided for chips and removed material. The advantage results from the open pores provided by the agglomerate abrasive grain according to the invention that binding agent can infiltrate the agglomerate abrasive grain via the open pores with embedding of the agglomerate abrasive grain into the abrasive, and that an extraordinarily stable incorporation of the agglomerate abrasive grain in the abrasive is thus obtained. This effect has an extremely positive impact on the abrasive performance, because a high portion of abrasive wear can typically be traced back to a break-out of the entire abrasive grain from the bond, in particular when working with grinding belts, without the abrasive grain having participated significantly in the grinding process, which can be prevented or at least reduced by means of the strong bonding of the agglomerate abrasive grain.

With the present works, it became apparent that both the open porosity as well as the closed porosity should be in the range of between 5 and 40% by volume, whereby the sum of open and closed porosity (total porosity), however, should be less than 50% by volume of the agglomerate abrasive grain. Advantageously, the total porosity is thereby so high that the bulk density of the agglomerate abrasive grain is less than 1.0 g/cm$^3$, preferably less than 0.9 g/cm$^3$.

Hollow bodies of any materials can be used as source material for the closed pores. Due to the desired high strength of the bond in the agglomerate abrasive grain, inorganic hollow bodies on the basis of aluminum oxide, silicon oxide, zirconium oxide, titanium oxide, cerium oxide and/or mixtures thereof are preferably used. In this context, hollow spheres made of glass, which can be obtained inexpensively on the market in different sizes, have particularly proven themselves for the use in the agglomerate abrasive grain according to the invention. The hollow spheres made of glass have a sufficient strength to ensure the desired breaking strength of the agglomerate abrasive grain. They can further be incorporated without any problems in the agglomerate abrasive grain by means of the inorganic binder on the basis of aluminosilicate and alkali silicate. The strength of the hollow spheres made of glass is thereby not so high that the self-sharpening mechanism of the agglomerate abrasive grain would fail.

In accordance with an advantageous embodiment of the agglomerate abrasive grain according to the present invention the agglomerate abrasive grain comprises between 5% by weight and 30% by weight of binding matrix, between 60% by weight and 90% by weight of abrasive grains, and between 0.5% by weight and 15% by weight of hollow bodies. Expressed in percentage by volume, an advantageous embodiment of the agglomerate abrasive grain has between 5% by volume and 40% by volume of binding matrix, between 10% by volume and 70% by volume of abrasive grains, between 5% by volume and 40% by volume of hollow bodies and between 5% by volume and 40% by volume of open pores.

The percentage by volume of abrasive grains in the agglomerate abrasive grain is preferably larger than the percentage by volume of hollow bodies, wherein the volume ratio of abrasive grains to hollow bodies is advantageously between 9:1 and 1.5:1, particularly advantageously between 6:1 and 2:1. Particularly good results were found, when approx. 30% by volume of the abrasive grains are replaced by hollow bodies.

In spite of the incorporated hollow bodies and the open pores, due to the used inorganic binder, the grain fracture strength (CFF according to Vollstädt) of the agglomerate abrasive grains is relatively high and is stated between 10 N and 40 N. The corresponding measurements of the grain fracture strength were carried out by means of a test apparatus, which had been developed for strength tests of diamonds (Vollstädt, Diatest SI). The abrasive grain is thereby crushed in a piston cell and the maximum force (Compressive Fracture Force=CFF), at which the grain bursts, is recorded. The pressure sensor is adapted to the agglomerate abrasive grains, which are to be measured, for the measuring range of between 0 and 200 Newton. For preparing the samples, a suitable fraction is screened in the range of between 850 µm and 710 µm (=between 20 mesh and 24 mesh), which is then further sorted via a vibrating table relative to the grain shape. Between 150 and 200 individual measurements are carried out with the measuring fractions obtained thereby, so that sufficient statistically reliable values result for the average grain strength. High CFF values guarantee a good processability and transportability of the agglomerate abrasive grains.

The particle diameters of the abrasive grains and of the hollow bodies, in each case comprising an average particle diameter in a comparable range between 250 µm and 5 µm, wherein the ratio of the average particle diameter of the abrasive grains to the average particle diameter of the hollow bodies preferably is between 2:1 and 1:2. An advantageous embodiment of the agglomerate abrasive grains according to the present invention provides for the average particle diameter of the hollow bodies to be larger than or equal to the average particle diameter of the abrasive grains, respectively.

The ratio of the percentage by volume or of the number of the abrasive grains to the volume ratio or the number of the hollow bodies is the essential factor for the strength of the agglomerate abrasive grain. Depending on the application, the agglomerate abrasive grain can be adapted to the respective intended purpose by means of a simple variation of this ratio, whereby the ratio of the percentage by volume of the abrasive grains in the agglomerate abrasive grain to the percentage by volume of the hollow bodies preferably is between 6:1 and 2:1. Due to the fact that the average particle diameter of the hollow bodies is preferably larger than or equal to the average particle diameter of the abrasive grains, respectively, a preferred embodiment of the agglomerate abrasive grain according to the invention thus provides more abrasive grains than hollow bodies to be present in the agglomerate abrasive grain in numerical terms.

In addition to the above-described possibilities of variation and the adjustment of the open porosity, it is furthermore possible to vary the characteristics of the agglomerate abrasive grain by varying the binding matrix. In an advantageous embodiment, the binding matrix thus comprises approx. between 20% by weight and 60% by weight of a phosphate, based on the total weight of the binding agent. In addition, the binding agent can comprise approx. between 2% by weight and approx. 15% by weight of a fine grain comprising an average grain size of 0.35 µm. In this case, it has proven to be particularly advantageous to use fine grain sizes from the group consisting of corundum, fused corundum, sintered corundum, alumina zirconia, silicon carbide, boron carbide, cubic boron nitride, diamond and/or mixtures thereof. Due to the fact that in particular the binding matrix is to be changed by means of the fine grain, it is not necessary to use a fine grain size, which is equivalent to the respective used abrasive grains. It thus lends itself to use fused corundum, which can be obtained inexpensively in large quantities on the market, as fine grain.

In addition to the above-listed components, the binder can additionally comprise fillers and/or grinding aids, for the purpose of which all of the known fillers and abrasive aids, in particular from the group of the sulfides, phosphates, carbonates and/or halides and/or sulfide-, phosphate-, carbonate-, and/or halide-containing complex compounds from the group comprising the elements sodium, silicon, potassium, magnesium, calcium, aluminum, manganese, copper, zinc, iron, titanium, antimony and/or tin, are used.

The agglomerate abrasive grain according to the invention preferably has an average diameter of between 0.05 and 3 mm, while the average grain size of the individual abrasive grains connected to one another in the agglomerate abrasive grain preferably lies between 30 µm and 200 µm.

Subject matter of the present invention is also a method for producing agglomerate abrasive grains comprising an open porosity of between 5% by volume and 40% by volume, a closed porosity of between 5% by volume and 40% by volume, and a total porosity of less than 50% by volume. For this purpose, a mixture of individual abrasive grains, selected from the group consisting of corundum, fused corundum, sintered corundum, alumina zirconia, silicon carbide, boron carbide, cubic boron nitride, diamond and/or mixtures thereof, and the hollow bodies, which provide the agglomerate abrasive grains with a closed porosity, is incorporated into a binding matrix on the basis of aluminosilicate and alkali silicate comprising a molar ratio of $Al_2O_3$ to $SiO_2$ in the range of between 1:2 and 1:20. The method comprising the steps:
mixing the abrasive grains and hollow bodies with the binding agent of aluminosilicate, alkali silicate and water,
drying the such obtained agglomerate abrasive grain green bodies at a temperature of between 80° and 150° C.,
classifying the dried agglomerate abrasive grain green bodies to a defined grit size and
hardening the classified agglomerate abrasive grains at a temperature of below 500° C.

The classification of the agglomerate abrasive grains is preferably carried out according to the FEPA standard (Federation of European Producers of Abrasives).

Following the invention will be additionally explained in detail by means of examples.

EXAMPLE 1

Comparison

For the production of the comparative example, 3 kg of abrasive grains (ZK40 P180, Treibacher Schleifmittel) were mixed with 25 g of metakaolin (OPACILITE, Imerys) and 333 g of corundum micro grain (ESK P1400F, Treibacher Schleifmittel) in an intensive mixer (type RO1, Eirich) for 5 minutes in counter flow. One part of the mixture for the granules production was subsequently placed onto a rotating pelletizing table (type TR04, EIRICH) at 200 rpm and at an incline corresponding to stage 8 to 9 and was thereby sprayed with a diluted sodium silicate solution (30%). While successively adding grain mixture and sodium silicate, granules that formed are conveyed to the edge of the dish granulator due to the force of gravity and were collected. A total of 500 g of sodium silicate solution was added. The agglomerate abrasive grain green bodies obtained in this way were classified, wherein a fraction in the range of between 1180 μm and 850 μm was separated, subsequently dried in a drying chamber with recirculating air for one hour at 125° C., and then calcined in a rotary kiln at 450° C.

EXAMPLES 2 TO 5

The production of examples 2 to 5 was carried out such as example 1, wherein, however, 10% by volume of the abrasive grains were in each case successively replaced by hollow spheres on the basis of silicon oxide and aluminum oxide (e-spheres, Erbslöh) comprising an average particle diameter of 80 μm. 300 g of abrasive grain (ZK40 P180) were in each case replaced by 34.5 g of e-spheres.

EXAMPLES 7 TO 9

The production of the samples was carried out such as example 4, wherein, however, the portion of open pores was varied by different quantities of binder. Only 250 ml of a diluted sodium silicate solution together with 12.5 g of metakaolin and 166.5 g of corundum fine grain as binder were thereby used for example 7. 750 ml or 1000 ml, respectively, of sodium silicate solution together with 37.5 g or 50 g, respectively, of metakaolin and 499.5 g or 666 g, respectively of ESK P1400F were thereby used for examples 8 or 9, respectively.

EXAMPLES 10 AND 11

The production of the agglomerate abrasive grains was carried out analogously to example 4, wherein, however, hollow bodies having a lower average particle diameter were used in example 10 and hollow bodies having a larger average particle diameter were used in example 11, while alumina zirconia ZK 40 P 180 was still used as individual abrasive grains.

Grinding Tests

Vulcanized fiber discs, by means of which a rod of steel 1.4301 (X5CrNi18-10; V2A) comprising a diameter of 20 mm was abraded, were produced from agglomerate abrasive grains having an average grain size of approx. 1 mm, which grains were produced according to the above-described examples 1 to 11. Five grinding intervals of 30 seconds were thereby carried out in each case with a wheel speed of 30 m/s, an rpm of 2700, and a contact pressure of 20 N. In addition to the material removal, the grain wear was measured and the G-ratio was calculated therefrom. Furthermore the surface was optically evaluated, wherein a differentiation was made between very good=completely homogenous surface, good=homogenous surface comprising slight irregularities, medium=substantially homogenous surface comprising clearly visible irregularities and bad=inhomogeneous surface.

The composition and some physical data of examples 1 to 11 are summarized in Table 1 below.

TABLE 1

| Example No. | Composition (% by vol.) | | | | Bulk Density $g/cm^3$ | Fracture Strength CFF (N) |
|---|---|---|---|---|---|---|
| | abrasive grain ZK40 P180 | binder | hollow body (80 μm) | open pores | | |
| 1 (comparison) | 65.9 | 15.3 | — | 18.8 | 0.92 | 19 |
| 2 | 61.1 | 15.8 | 6.8 | 16.3 | 0.88 | 17.5 |
| 3 | 53.5 | 15.5 | 13.4 | 17.6 | 0.85 | 17 |
| 4 | 47.7 | 15.8 | 20.4 | 16.1 | 0.81 | 14.5 |
| 5 | 39.8 | 15.4 | 26.6 | 18.2 | 0.72 | 13 |
| 6 (comparison) | 32.6 | 15.1 | 32.6 | 19.7 | 0.68 | 11.5 |
| 7 | 46.6 | 7.7 | 20.0 | 25.7 | 0.74 | 10.5 |
| 8 | 46.0 | 22.8 | 19.7 | 12.5 | 0.86 | 17.5 |
| 9 | 44.0 | 29.2 | 18.9 hollow body | 7.9 | 0.90 | 24 |
| 10 | 49.1 | 16.3 | 20.9 (55 μm) | 13.7 | 0.82 | 15.2 |

TABLE 1-continued

| Example No. | Composition (% by vol.) | | | | Bulk Density g/cm³ | Fracture Strength CFF (N) |
|---|---|---|---|---|---|---|
| | abrasive grain ZK40 P180 | binder | hollow body (80 μm) | open pores | | |
| 11 | 44.7 | 14.8 | 19.2 (120 μm) | 21.3 | 0.78 | 14.8 |

Remarks: The percentages per volume of open pores were determined by mercury porosimetry. Based on the determined values, the percentages by volume for the abrasive grains, the binder matrix and the hollow bodies were then calculated with respect to the used quantities. For this purpose, a specific weight of 4.0 g/cm³ was assumed for the abrasive grains as well as for the fine grain used for the binder matrix, a specific weight of 2.4 g/cm³ was assumed for the siliceous binder (metakaolin and sodium silicate), and a specific weight of 0.46 g/cm was supposed for the hollow spheres made of glass.

The results of the grinding tests are summarized in Table 2 below:

TABLE 2

Grinding Tests ZK40 P180

| Example No. | Removal (g) | Grain Wear (g) | Surface | G-Ratio |
|---|---|---|---|---|
| 1 (comparison) | 10.8 | 0.7 | bad | 15.4 |
| 2 | 14.5 | 0.8 | good | 18.2 |
| 3 | 15.8 | 0.85 | very good | 18.6 |
| 4 | 16.4 | 0.87 | very good | 18.8 |
| 5 | 17.0 | 1.0 | very good | 17.0 |
| 6 (comparison) | 15.4 | 1.4 | very good | 11.0 |
| 7 | 14.8 | 0.88 | very good | 16.8 |
| 8 | 15.7 | 0.93 | good | 16.9 |
| 9 | 14.4 | 1.0 | medium | 14.4 |
| 10 | 13.4 | 0.8 | good | 16.8 |
| 11 | 12.5 | 1.2 | very good | 10.4 |

Based on the comparative example 1, which does not include any hollow bodies, a part of the individual abrasive grains was successively replaced by hollow bodies in examples 1 to 6. By replacing 10% by volume of the abrasive grains with hollow bodies (example 2), a considerable improvement of the G-ratio (quotient of material removal and wear) can already be identified, wherein in particular the surface quality is also considerably improved. Even though the fracture strength of the agglomerate abrasive grains is decreased by further replacing individual abrasive grains with hollow spheres, this does not have a negative effect with respect to the grinding test, because the cutting ability of the agglomerate abrasive grain is increased, which is reflected in the high removal rate. At the same time, the fracture strength of the agglomerate abrasive grain is still high enough to keep the grain wear within limits, so that high G-ratios result. The best results are achieved when replacing approx. 30% by vol. of the individual abrasive grains with hollow bodies (example 4). Higher portions of hollow bodies, as in examples 5 and 6, in which approx. 40% by vol. or approx. 50% by vol., respectively, of the abrasive grains are in each case replaced by hollow bodies, lead to a destabilization of the agglomerate abrasive grains, so that an increased grain wear, still having very good removal rates, leads to decreased G-ratios, wherein an excellent workpiece surface quality, however, can always be observed, in particular with the examples comprising large portions of hollow bodies.

The ratio of open pores to closed pores was varied in examples 7 to 9. The increase of the open porosity in example 7 leads to a considerable deterioration of the fracture strength and to an increased grain wear resulting therefrom and to a decreased G-ratio in comparison with example 4. Even though the decrease of the open porosity in examples 8 and 9 results in an increase of the fracture strength, this, however, does not have a positive effect on the grinding result, because a high grain wear can be identified despite the high fracture strength of the agglomerate abrasive grains. The high grain wear is possibly caused by the fact that the bonding of the agglomerate abrasive grains having a lower open porosity into the abrasive being no longer optimal, whereby a break-out of the entire agglomerate abrasive grain from the bond is made possible, which is favored even more by the high facture strength of the agglomerate abrasive grain. The correlation between the open porosity and the bonding into the abrasive follows from the possibility of infiltrating liquid binding agent into the open pores during the bonding of the agglomerate abrasive grain and thus anchoring the agglomerate abrasive grain in the abrasive.

The particle size of the hollow bodies was varied in examples 10 and 11, whereby it can be summarized that the best results were obtained, when the particle size of the hollow bodies corresponds approximately to the particle size of the abrasive grains. Particularly good results were obtained when the average particle size of the hollow bodies was slightly larger than the average particle size of the abrasive grains.

In this context, it is to be pointed out once again that the above-described principles and advantageous embodiments of the agglomerate abrasive grains according to the invention apply in particular to the machining of surfaces, when materials are used, which are to be treated moderately, using pressures, which are not too high. Other principles, which are the subject matter of further tests, might possibly apply for other materials and other grinding conditions.

EXAMPLES 12 TO 17

The production of examples 12 to 17 was carried out such as examples 1 to 6, wherein, however, semi-friable aluminum oxide FRPL having the grit size P320 was used instead of the alumina zirconia ZK40 having the grit size P180 as individual abrasive grains. The particle size of the hollow bodies was adapted accordingly, wherein hollow bodies with the identification "Q-cel 5070" (Potters, Ballotini GmbH) on the basis of silicon oxide having an average diameter of 55 μm instead of the hollow bodies on the basis of silicon oxide and aluminum oxide having an average diameter of 80 μm were now mixed with the semi-friable aluminum oxide. The other conditions were maintained.

To produce the comparative example 12, a mixture of 3 kg of abrasive grains (FRPL P320, Treibacher Schleifmittel), 25 g of metakaolin (OPACILITE, Imerys) and 333 g of corundum micro grit (ESK P1400F) were mixed in an intensive mixer (type RO1, Eirich) for 5 minutes in counter flow. One part of the mixture for the granules production was subsequently placed onto a rotating pelletizing table (type PR04, EIRICH) at 200 rpm and at an incline corresponding to stage 8 to 9, and was thereby sprayed with a diluted sodium silicate solution (30%). While successively adding grain mixture and sodium silicate, granulates that formed are conveyed to the edge of the dish granulator due to the force of gravity and were collected. A total of 500 g of sodium silicate solution was added. The agglomerate abrasive grain green bodies obtained in this manner were classified, wherein a fraction in the range of between 1180 μm and 850 μm was separated, subsequently dried in a drying chamber with recirculating air for one hour at 125° C., and then calcined in a rotary kiln at 450° C.

For examples 13 to 17, 10% by vol. of the abrasive grains was in turn replaced successively by 10% by vol. of hollow spheres comprising an average diameter of 55 μm.

EXAMPLES 18 TO 20

The production of examples 18 to 20 took place as in example 15, wherein, however, the portion of open pores was varied by different quantities of binder. Only 250 ml of a diluted sodium silicate solution together with 12.5 g of metakaolin and 166.5 g of ESK P1400F were thereby used as binder for example 18. 750 ml or 1000 ml, respectively, of sodium silicate solution together with 37.5 g or 50 g, respectively, of metakaolin and 399.5 g or 666 g, respectively, of ESK P1400F were thereby used in each case for examples 19 and 20.

EXAMPLES 21 AND 22

The production of the agglomerate abrasive grains took place analogously to example 15, wherein, however, hollow bodies comprising a lower average particle diameter (30 μm) were used in example 21 and hollow bodies comprising a larger average particle diameter (80 μm) were used in example 22, while semi-friable aluminum oxide FRPL P320 was still used as individual abrasive grains.

Grinding Tests

Vulcanized fiber wheels, by means of which a rod of steel 1.4301 (X5CrNi18-10; V2A) comprising a diameter of 20 mm was abraded, were produced from agglomerate abrasive grains having an average grain size of approx. 1 mm, which grains were produced according to the above-described examples 12 to 22. Five grinding intervals of 30 seconds were thereby carried out in each case with a wheel speed of 30 m/s, an rpm of 3700, and a contact force of 30 N. In addition to the material removal, the grain wear was measured and the G-ratio was calculated therefrom. In addition, the surface was evaluated optically, wherein a distinction was made between very good=completely homogenous surface, good=homogenous surface comprising slight irregularities, medium=substantially homogenous surface comprising clearly visible irregularities and bad=inhomogeneous surface.

TABLE 3

| | Composition (% by vol.) | | | | | |
|---|---|---|---|---|---|---|
| Example No. | abrasive grain FRPL P320 | binder | hollow body (55 μm) | open pores | Bulk Density g/cm³ | Fracture Strength CFF (N) |
| 12 (comparison) | 63.9 | 14.8 | — | 21.3 | 0.94 | 22.5 |
| 13 | 58.2 | 15.0 | 6.4 | 20.4 | 0.90 | 18 |
| 14 | 50.2 | 14.5 | 12.5 | 22.8 | 0.85 | 15 |
| 15 | 43.1 | 14.3 | 18.5 | 24.1 | 0.78 | 14.8 |
| 16 | 37.3 | 14.4 | 24.8 | 23.5 | 0.72 | 13.7 |
| 17 (comparison) | 31.4 | 14.5 | 31.4 | 22.7 | 0.63 | 13.4 |
| 18 | 44.8 | 7.4 | 19.2 | 28.6 | 0.9 | 17.2 |
| 19 | 44.2 | 22.0 | 19.0 | 14.8 | 0.85 | 18.8 |
| 20 | 42.9 | 28.5 | 18.4 hollow body | 10.2 | 0.87 | 21.4 |
| 21 | 42.2 | 14.0 | 18.1 (30 μm) | 25.7 | 0.76 | 17.4 |
| 22 | 45.3 | 15.0 | 19.4 (80 μm) | 20.3 | 0.73 | 18.2 |

The composition and some physical data, such as fracture strength and bulk density, of the agglomerate abrasive grains obtained according to examples 12 to 22 are summarized in Table 3. The percentages by volume of abrasive grains, binder and hollow bodies were calculated on the basis of the measured open porosity as in the case of the examples presented in Table 1.

The results of the grinding tests are summarized in Table 4 below:

TABLE 4

| | Grinding tests FRPL P320 | | | |
|---|---|---|---|---|
| Example No. | Removal (g) | Grain Wear (g) | Surface | G-Ratio |
| 12 (comparison) | 1.8 | 0.2 | bad | 9.0 |
| 13 | 2.2 | 0.18 | good | 12.2 |
| 14 | 2.3 | 0.22 | very good | 10.5 |
| 15 | 2.6 | 0.18 | very good | 14.4 |
| 16 | 2.6 | 0.21 | very good | 12.4 |
| 17 (comparison) | 2.3 | 0.24 | very good | 9.6 |
| 18 | 2.2 | 0.19 | good | 11.6 |
| 19 | 2.2 | 2.1 | good | 10.5 |
| 20 | 2.4 | 2.6 | medium | 9.2 |
| 21 | 1.9 | 0.2 | medium | 9.5 |
| 22 | 1.6 | 0.2 | very good | 8.0 |

Examples 12 to 22 were established according to the same model as examples 1 to 11. It was possible to confirm the principles, which had already been found in the case of the agglomerate abrasive grains made up of the coarser abrasive grains. The best results were thus obtained with an agglomerate abrasive grain, in the case of which approx. 30% by vol. of the individual abrasive grains are replaced by hollow bodies (example 15). It was also confirmed for the agglomerate abrasive grains made up of finer abrasive grains that hollow bodies and abrasive grains should advantageously have the same particle sizes, which follows from the comparison of examples 21 and 22 with example 15.

The invention claimed is:
1. An agglomerate abrasive grain comprising a plurality of individual abrasive grains incorporated into a binding matrix, wherein:

the abrasive grains are selected from the group consisting of corundum, fused corundum, sintered corundum, alumina zirconia, silicon carbide, boron carbide, cubic boron nitride, diamond, and mixtures thereof;

the binding matrix is obtained from a mixture of an aluminosilicate, an alkali sodium silicate, and water;

the aluminosilicate and the alkali sodium silicate having a molar ratio of $Al_2O_3$ to $SiO_2$ ranging from 1:2 to 1:20;

the binding matrix is hardened at temperatures below 500° C.;

the agglomerate abrasive grain has an open porosity ranging from 5% by volume to 25% by volume, the agglomerate abrasive grain further comprising hollow bodies that are incorporated into the binding matrix and that provide the agglomerate abrasive grain with a closed porosity, wherein the hollow bodies are 5% to 40% by volume of the agglomerate abrasive grain, and the sum of closed and open porosity is less than 50% by volume of the agglomerate abrasive grain;

further wherein the abrasive grains and the hollow bodies have an average particle diameter ranging from 5 μm to 250 μm, and wherein the ratio of the average particle diameter of the abrasive grains to the average particle diameter of the hollow bodies ranges from 2:1 to 1:2.

2. The agglomerate abrasive grain according to claim 1, characterized in that the percentage by volume of the abrasive grains to the percentage by volume of the hollow bodies has a ratio ranging from 9:1 to 1.5:1.

3. The agglomerate abrasive grain according to claim 2, characterized in that the percentage by volume of the abrasive grains to the percentage by volume of the hollow bodies has a ratio ranging from 6:1 to 2:1.

4. The agglomerate abrasive grain according to claim 1, characterized in that the agglomerate abrasive grain comprises from 10% by volume to 80% by volume of abrasive grains, from 5% by volume to 40% by volume of hollow bodies, from 5% by volume to 40% by volume of binding matrix, and from 5% by volume to 25% by volume of open pores.

5. The agglomerate abrasive grain according to claim 1, characterized in that the hollow bodies are selected from the group consisting of hollow bodies on the basis of aluminum oxide, silicon oxide, zirconium oxide, titanium oxide, cerium oxide, and/or mixtures thereof.

6. The agglomerate abrasive grain according to claim 5, characterized in that the hollow bodies are hollow spheres made of glass.

7. The agglomerate abrasive grain according to claim 1, characterized in that the agglomerate abrasive grain comprises from 5% by weight to 30% by weight of binding matrix, from 60% by weight to 95% by weight of abrasive grains, and from 0.3% by weight to 20% by weight of hollow bodies.

8. A method for producing agglomerate abrasive grains according to claim 1, wherein a mixture of individual abrasive grains and hollow bodies are incorporated into a binding matrix of aluminosilicate and alkali sodium silicate having a molar ratio of $Al_2O_3$ to $SiO_2$ ranging from 1:2 to 1:20, the method comprising:

mixing the abrasive grains and hollow bodies with the binding agent of aluminosilicate, alkali sodium silicate, and water, drying the agglomerate abrasive grain green bodies obtained in this manner at a temperature ranging from 80° to 150° C.;

classifying the dried agglomerate abrasive grain green bodies to a defined abrasive grit size; and hardening the dried and classified agglomerate abrasive grains at a temperature below 500° C.

\* \* \* \* \*